United States Patent [19]

Eilingsfeld et al.

[11] Patent Number: 4,843,153

[45] Date of Patent: Jun. 27, 1989

[54] AZO DYES CONTAINING THIENOTHIOPHENE RADICALS AS RADICALS OF THE DIAZO COMPONENT

[75] Inventors: Heinz Eilingsfeld; Karl-Heinz Etzbach, both of Frankenthal; Guenter Hansen, Ludwigshafen; Helmut Reichelt, Niederkirchen, all of Fed. Rep. of Germany

[73] Assignee: BASF Aktiengesellschaft, Ludwigshafen, Fed. Rep. of Germany

[21] Appl. No.: 68,341

[22] Filed: Jul. 1, 1987

[30] Foreign Application Priority Data

Jul. 2, 1986 [DE] · Fed. Rep. of Germany ....... 3622136

[51] Int. Cl.$^4$ ................... C09B 29/033; C09B 29/08; C09B 29/36; D06P 3/52
[52] U.S. Cl. .................................. 534/752; 534/630; 534/640; 534/643; 534/651; 534/738; 534/753
[58] Field of Search ............... 534/752, 630, 640, 643, 534/651, 738

[56] References Cited

U.S. PATENT DOCUMENTS 4,081,435  3/1978  Baird et al. .................... 534/752

FOREIGN PATENT DOCUMENTS 2101701   7/1972  Fed. Rep. of Germany ...... 534/752
3416515  11/1984  Fed. Rep. of Germany ...... 534/752
58-2351   7/1983  Japan ................................ 534/752
58-157863 9/1983  Japan ................................ 534/752
60-228568 11/1985 Japan ................................ 534/752

Primary Examiner—Floyd D. Higel
Attorney, Agent, or Firm—Oblon, Fisher, Spivak, McClelland, Maier & Neustadt

[57] ABSTRACT

Thienothiophene dyes of the formula

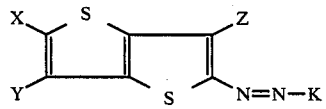

where
Z is carboxylate, acyl, carboxyl, substituted or unsubstituted carbamoyl, cyano or nitro, X is hydrogen, fluorine, chlorine, bromine, Z or a group of the formula $-CH=CT^1T^2$, $-CH=N-OH$, $-CH=N-NH-C_6H_5$ or

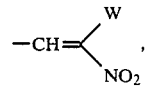

where
$T^1$ and $T^2$ are identical or different and each is independently of the other cyano, substituted or unsubstituted alkoxycarbonyl, alkenyloxycarbonyl, carbamoyl or alkylcarbamoyl and W is hydrogen, methyl or ethyl, Y is hydrogen, chlorine or bromine and K is the radical of a coupling component, are highly suitable for dyeing synthetic fibers, in particular polyesters wherein the dyeing obtained have good fastness properties.

6 Claims, No Drawings

AZO DYES CONTAINING THIENOTHIOPHENE RADICALS AS RADICALS OF THE DIAZO COMPONENT

The present invention relates to a thienothiophene dye of the formula I

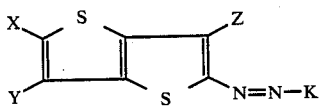

where

Z is $C_1$–$C_8$-alkoxycarbonyl whose alkyl chain may be interrupted by one or more oxygen atoms, or is substituted or unsubstituted phenoxycarbonyl, carbamoyl, $C_1$–$C_8$-mono-alkylcarbamoyl or -dialkylcarbamoyl, pyrrolidinocarbonyl, piperidinocarbonyl, morpholinocarbonyl, piperazinocarbonyl, (N-$C_1$–$C_4$-alkyl)piperazinocarbonyl, carboxyl, cyano, $C_1$–$C_{10}$-alkanoyl, substituted or unsubstituted phenylcarbonyl, $C_1$–$C_4$-alkylsulfonyl, substituted or unsubstituted phenylsulfonyl or nitro, X is hydrogen, fluorine, chlorine, bromine, Z or a group of the formula $-CH=CT^1T^2$, $-CH=N-OH$, $-CH=N-NH-C_6H_5$ or

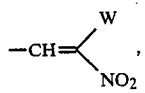

where $T^1$ and $T^2$ are identical or different and each is, independently of the other, cyano, $C_1$–$C_8$-alkoxy carbonyl whose alkyl chain may be interrupted by one or more oxygen atoms, or is $C_3$–$C_6$-alkenyloxycarbonyl, carbamoyl or $C_1$–$C_4$-mono-alkylaminocarbonyl or -dialkylaminocarbonyl and W is hydrogen, methyl or ethyl, Y is hydrogen, chlorine or bromine and K is the radical of a coupling component.

Any alkyl in the formula of the thienothiophene dye according to the invention may be straight-chain or branched. Where substituted phenyl occurs in the formula of the thienothiophene dye according to the invention, the substituents may be $C_1$–$C_4$-alkyl, $C_1$–$C_4$-alkoxy or halogen, in particular fluorine, chlorine or bromine.

Z and X in the formula I are for example: CHO, $CH_3CO$, $C_2H_5CO$, $C_3H_7CO$, $C_4H_9CO$, $C_5H_{11}CO$, $C_7H_{15}CO$,

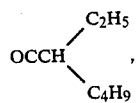

$C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$,

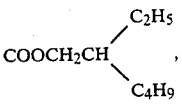

$COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$ or

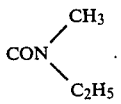

$T^1$ and $T^2$ in the formula I are for example methoxycarbonyl, ethoxycarbonyl, propoxycarbonyl, isopropoxycarbonyl, butoxycarbonyl, isobutoxycarbonyl, secbutoxycarbonyl, pentyloxycarbonyl, isopentyloxycarbonyl, sec-pentyloxycarbonyl, tert-pentyloxycarbonyl, hexyloxycarbonyl, heptyloxycarbonyl, octyloxycarbonyl, 2-ethylhexyloxycarbonyl, 2-methoxyethoxycarbonyl, 2-ethoxyethoxycarbonyl, 2-butoxyethoxycarbonyl, 3-methoxypropoxycarbonyl, 3,6-dioxaheptyloxycarbonyl, allyloxycarbonyl, 2-methylallyloxycarbonyl, 2-ethylallyloxycarbonyl, methylaminocarbonyl, ethylaminocarbonyl, propylaminocarbonyl, dimethylaminocarbonyl, diethylaminocarbonyl or methylethylaminocarbonyl.

K is derived from a coupling component of the formula HK. This type preferably comes from the aniline, α-naphthylamine, pyrazole, aminopyrazole, indole, thiazole, thiophene, phenol, naphthol, tetrahydroquinoline, pyridone or pyridine series, preference being given to coupling components from the aniline, pyrazole, pyridine, thiophene or thiazole series.

This coupling component HK has the formula

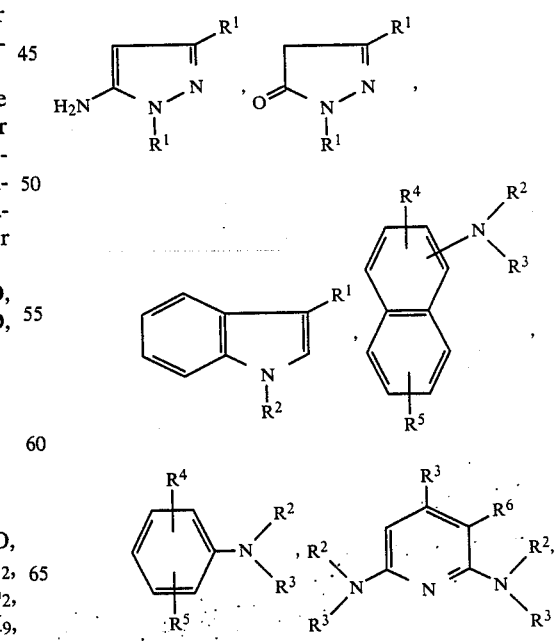

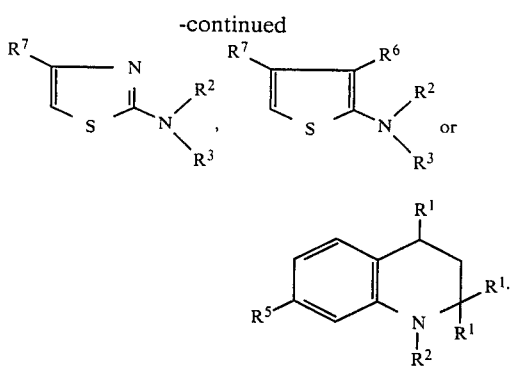

where
R[1] is hydrogen, $C_1$–$C_4$-alkyl which may be substituted by phenyl, or substituted or unsubstituted phenyl, R[2] is hydrogen or R[3], R[3] is substituted or unsubstituted $C_1$–$C_6$-alkyl, $C_5$–$C_7$-cycloalkyl, $C_3$–$C_4$-alkenyl or substituted or unsubstituted phenyl, R[4] and R[5] are each independently of the other hydrogen, $C_1$–$C_4$-alkyl, $C_1$–$C_4$-alkoxy, phenoxy, benzyloxy, halogen, $C_1$–$C_4$-alkylsulfonylamino, $C_1$–$C_4$-dialkylaminosulfonylamino, substituted or unsubstituted $C_1$–$C_6$-alkanoylamino, benzoylamino or $C_1$–$C_4$-alkoxycarbonylamino, R[6] is cyano, carbamoyl, $C_1$–$C_4$-monoalkylcarbamoyl or -dialkylcarbamoyl, nitro or $C_1$–$C_8$-alkoxycarbonyl whose alkyl chain may be interrupted by one or more oxygen atoms, and R[7] is halogen, nitro, substituted or unsubstituted phenyl, $C_1$–$C_{10}$-alkyl or $C_1$–$C_{10}$-alkoxy, where in either case the alkyl chain may be interrupted by one or more oxygen atoms and/or substituted by phenyl, or is phenoxy, $C_1$–$C_4$-monoalkylamino or -dialkylamino, $C_1$–$C_4$-alkylthio, phenylthio, $C_1$–$C_4$-alkoxycarbonyl, $C_1$–$C_5$-alkanoylamino, $C_1$–$C_4$-alkoxycarbonylmethyl or cyanomethyl.

Specific examples of R[1], in addition to those already mentioned, are methyl, ethyl, propyl, butyl, benzyl, 2-phenylethyl, phenyl, o-, m- or p-tolyl and o-, m- or p-chlorophenyl.

Examples of R[3], in addition to those already mentioned, are $C_1$–$C_6$-alkyl, which may be monosubstituted or polysubstituted by chlorine, bromine, hydroxyl, $C_1$–$C_8$-alkoxy, propargyloxy, phenoxy, phenyl, cyano, carboxyl, $C_1$–$C_8$-alkanoyloxy, $C_1$–$C_8$-alkoxy-$C_1$–$C_4$-alkoxy, benzoyloxy, o-, m- or p-methylbenzoyloxy, o-, m- or p-chlorobenzoyloxy, $C_1$–$C_8$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenethyloxycarbonyl.

Specific examples of R[3] are methyl, ethyl, propyl, butyl, pentyl, hexyl, benzyl, 2-phenylethyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-$\beta$-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl, 2-benzoylethyl, cyclopentyl, cyclohexyl, cycloheptyl, allyl, methallyl, phenyl, 2-methylphenyl and 4-chlorophenyl.

Where R[4] and R[5] are each substituted $C_1$–$C_6$-alkanoyl amino, suitable substituents are for example, chlorine, bromine, cyano, methoxy, ethoxy or phenoxy. Suitable R[4] and R[5], in addition to those already mentioned, are for example hydrogen, methyl, ethyl, propoyl, bromine, chlorine, methoxy, ethoxy, methylsulfonylamino, dimethylaminosulfonylamino, methoxycarbonylamino or ethoxycarbonylamino.

Examples R[6], in addition to those already mentioned, are methylaminocarbonyl, dimethylaminocarbonyl, ethylaminocarbonyl, diethylaminocarbonyl, methoxycarbonyl, ethoxycarbonyl, n- or i-propoxycarbonyl, n-, i- or sec-butoxycarbonyl, methoxyethoxycarbonyl, ethoxyethoxycarbonyl, n- or i-propoxyethoxycarbonyl and n-, i- or sec-butoxyethoxycarbonyl.

Examples of R[7], in addition to those already mentioned, are benzyl, benzyloxy, chlorine, bromine, $C_1$–$C_4$-alkoxyethoxy, acetylamino, propionylamino, butyrylamino and valerylamino.

Particular importance is given to thienothiophene dyes of the formula I containing coupling components from the aniline, $\alpha$-naphthylamino, thiazole, thiophene or pyridine series.

Particular preference is given to those thienothiophene dyes of the formula I where X is formyl, acetyl, $C_1$–$C_4$-alkoxycarbonyl, nitro or cyano, Y is hydrogen, Z is cyano, $C_1$–$C_2$-alkoxycarbonyl, $C_1$–$C_2$-monoalkylcarbamoyl, $C_1$–$C_2$-alkylsulfonyl or phenylsulfonyl, and K is the radical of a coupling component of the aniline, thiazole or pyridine series.

A mention has to be given in particular to those thienothiophene dyes of the formula I where Z is cyano, methoxycarbonyl or ethoxycarbonyl.

To prepare the thienothiophene dye of the formula I, a thienothiophene of the formula II

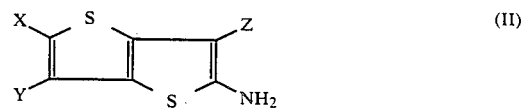

where X, Y and Z each have the abovementioned meanings, can be diazotized and reacted with a coupling component of the formula III

HK (III)

where K has the abovementioned meanings, in a conventional manner. Details of the preparation are revealed in the Examples.

The thienothiophene of the formula II can be obtained for example by reacting a thiophene of the formula IV

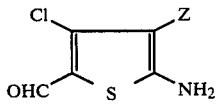

where Z has the abovementioned meanings, with a mercaptan of the formula V

where A is an electron-attracting radical.

The thienothiophene of the formula II were X is hydrogen, fluorine, chlorine or bromine can be obtained by further reaction from the compound of the formula VI

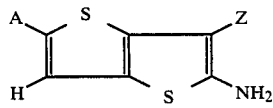

where A and Z each have the abovementioned meanings. In the same way, the thienothiophene of the formula II where Y is not hydrogen can be prepared by introducing chlorine or bromine into a compound of the formula VI.

Furthermore, to prepare the thienothiophene dye of the formula I it is also possible to react a thiophene dye of the formula VII

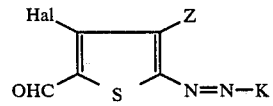

where K and Z each have the abovementioned meaning and Hal is halogen with a mercaptan (V). Details can again be found in the Examples.

In those compounds of the formulae I and II where X is formyl, this formyl group can be further reacted in a conventional manner. Possibilities are for example the condensation with hydroxylamine and, if desired, an acylation on the oxygen to form a nitrile or the reaction with phenylhydrazine or with an active methyl compound by Knoevenagel or Perkin.

The thienothiophene dye according to the invention is highly suitable for dyeing synthetic fibers, preferably polyesters and nylons, and blend fabrics of polyesters and cellulose fibers or cellulose esters. The dyeings obtained have good fastness properties, in particular on polyester.

Given a suitable structure, the dye may also be dischargeable under alkaline and/or reducing conditions in a conventional manner.

The Examples which follow illustrate the invention in more detail. The parts and percentages are by weight, unless otherwise stated.

EXAMPLE 1

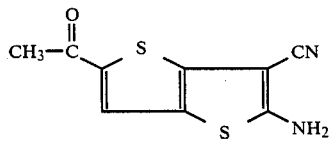

A mixture of 18.7 parts of 2-amino-4-chloro-3-cyano-5-formylthiophene, 13.8 parts of potassium carbonate and 80 parts of N,N-dimethylformamide was introduced first, and 9 parts of acetonylmercaptan were then added. After the exothermic reaction had died down, the mixture was heated at 60° C. for 1 hour and then discharged onto water. The precipitate was filtered off with suction, washed with water and dried. This gave 17.9 parts (81% of theory) of 5-acetyl-2-amino-3-cyanothieno[3,2-b]thiophene.

Melting point: 285° C. (decomposition, from methylglycol).

IR (KBr): 3,419, 3,326 ($NH_2$), 2,205 (CN), 1,654, 1,629 $cm^{-1}$ $C_9H_6N_2OS_2$ (222).

Calculated: C: 48.6, H: 2.7, N: 12.6, S: 28.9. Found: C: 48.2, H: 2.8, N: 12.4, S: 28.6.

EXAMPLE 2

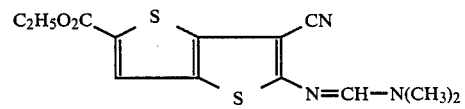

120 parts of ethyl thioglycolate were added to a mixture of 241.5 parts of N,N-dimethyl-N'-(4-chloro-3-cyano-5-formylthien-2-yl)formamidine, 138 parts of potassium carbonate and 1,400 parts of N,N-dimethylformamide. After the slightly exothermic reaction had died down, the reaction mixture was stirred at 50° C. for 2 hours. 1,000 parts of ice, 1,000 parts of water and 150 parts of concentrated hydrochloric acid were then added. The precipitate was filtered off with suction, washed with water and dried. This gave 284 parts (93% of theory) of N,N-dimethyl-N'-(3-cyano-5-ethoxycarbonylthieno[3,2-b]thien-2-yl)formamidine.

Melting point: 168° C. (from glacial acetic acid).

IR (KBr): 2,206 (CN), 1,701, 1,689 (C=O) 1,634, 1,623 $cm^{-1}$. $C_{13}H_{13}N_3O_2S_2$ (307).

Calculated: C: 50.8, H: 4.3, N: 13.7, O: 10.4, S: 20.9. Found: C: 50.9, H: 4.2, N: 13.7, O: 10.4, S: 20.3.

EXAMPLE 3

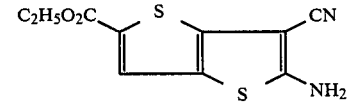

A mixture of 319 parts of N,N-dimethyl-N'-(3-cyano-5-ethoxycarbonylthieno[3,2-b]thien-2-yl)formamidine, 2,000 parts of ethanol and 210 parts of concentrated hydrochloric acid was heated at the boil for 1 hour. After cooling down, the precipitate was filtered off with suction, washed with methanol and then with water and dried. This gave 210 parts (80% of theory) of ethyl 2-amino-3-cyanothieno[3,2-b]thiophene-5-carboxylate.

Melting point: 250° C. (from glacial acetic acid).

IR (KBr): 3,418, 3,322 (NH$_2$), 2,205 (CN), 1,712, 1,694 cm$^{-1}$. C$_{10}$H$_8$N$_2$O$_2$S$_2$ (252).

Calculated: C: 47.6, H: 3.2, N: 11.1, O: 12.7, S: 25.4.
Found: C: 47.6, H: 3.3, N: 11.0, O: 13.1, S: 25.2.

EXAMPLE 4

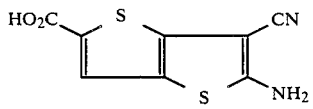

25.2 parts of 2-amino-3-cyanothieno[3,2-b]thiophene-5-carboxylate were added to a solution of 11.2 parts of potassium hydroxide, 10 parts of water and 150 parts of ethanol. The mixture was heated at the boil for 2 hours. The precipitate was then filtered off with suction, washed with ethanol and added to dilute hydrochloric acid. The hydrochloric acid suspension was stirred at room temperature for 3 hours. The product was then filtered off with suction and washed with water. Drying left 15 parts (67% of theory) of 2-amino-3-cyano-thieno[3,2-b]thiophene-5-carboxylic acid.

Melting point: 280° C. (decomposition).

IR (KBr): 3,421, 3,329 (NH$_2$), 3,200–2,350 (OH), 2,206 (CN), 1,661, 1,627 cm$^{-1}$.

C$_8$H$_4$N$_2$O$_2$S$_2$ (224).

Calculated: C: 42.9, H: 1.8, N: 12.5, O: 14.3, S: 28.6.
Found: C: 42.5, H: 1.9, N: 12.2, O: 15.3, S: 27.9.

Table 1 below gives 2-aminothieno[3,2-b]thiophenes of the formula

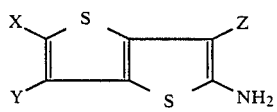

which can be obtained in a similar manner.

TABLE 1

| Example | X | Y | Z |
|---|---|---|---|
| 5 | CN | H | CN |
| 6 | NO$_2$ | H | CN |
| 7 | CO$_2$CH$_3$ | H | CN |
| 8 | CHO | H | CN |
| 9 | Cl | H | CN |

TABLE 1-continued

| Example | X | Y | Z |
|---|---|---|---|
| 10 | Br | H | CN |
| 11 | H | H | CN |
| 12 | CN | Cl | CN |
| 13 | COCH$_3$ | H | CO$_2$C$_2$H$_5$ |
| 14 | CO$_2$C$_2$H$_5$ | H | CO$_2$C$_2$H$_5$ |
| 15 | CN | H | CO$_2$C$_2$H$_5$ |
| 16 | NO$_2$ | H | CO$_2$C$_2$H$_5$ |
| 17 | COCH$_3$ | H | CO$_2$CH$_3$ |
| 18 | CO$_2$CH$_3$ | H | CO$_2$CH$_3$ |
| 19 | CN | H | CO$_2$CH$_3$ |
| 20 | C$_6$H$_5$CO | H | CN |

EXAMPLE 21

5.55 parts of 5-acetyl-2-amino-3-cyanothieno[3,2-b]thiophene were suspended at 0°–5° C. in 75 parts by volume of 3:1 glacial acetic acid/propionic acid and 50 parts by volume of 85% strength sulfuric acid. 8.25 parts of nitrosylsulfuric acid (11.5% of N$_2$O$_3$) were added dropwise with stirring. The mixture was then stirred at 0°–5° C. for 3 hours.

This diazonium salt solution was added at about 0° C. with stirring to a mixture of 5.65 parts of 3-(N,N-diethylamino)-1-acetanilide and 0.5 part of sulfamic acid in 100 parts by volume of N,N-dimethylformamide. The temperature was maintained by external cooling and sprinkling in about 400 parts of ice. The resulting dye suspension was then stirred for 3–4 hours. The dye of the formula

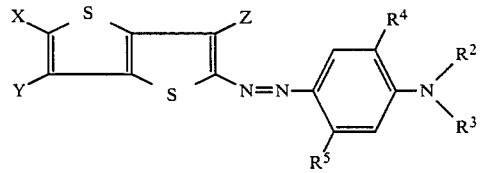

was filtered off with suction, washed with water until neutral and dried (9.1 parts). It dyes polyester fiber material in blue shades having very good fastness properties.

The dyes listed in Tables 2 and 3 below can be prepared in a similar manner.

The dyes of Table 2 conform to the formula

TABLE 2

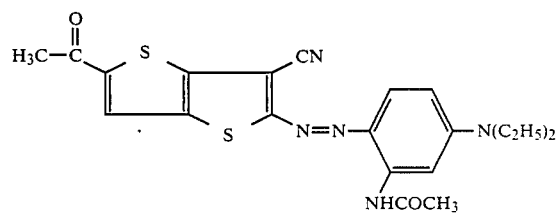

| Exp. | X | Y | Z | R$^5$ | R$^4$ | R$^3$ | R$^2$ | Hue on PES |
|---|---|---|---|---|---|---|---|---|
| 22 | COCH$_3$ | H | CN | CH$_3$ | H | C$_2$H$_5$ | C$_2$H$_5$ | reddish blue |
| 23 | COCH$_3$ | H | CN | CH$_3$ | H | C$_4$H$_9$ | C$_4$H$_9$ | reddish blue |
| 24 | COCH$_3$ | H | CN | NHCOCH$_2$Cl | H | C$_2$H$_5$ | C$_2$H$_5$ | blue |
| 25 | COCH$_3$ | H | CN | NHCOCH$_2$OCH$_3$ | H | C$_2$H$_5$ | C$_2$H$_5$ | blue |
| 26 | COCH$_3$ | H | CN | NHCOC$_2$H$_5$ | H | C$_2$H$_5$ | C$_2$H$_5$ | blue |
| 27 | COCH$_3$ | H | CN | NHCOCH$_3$ | H | C$_4$H$_9$ | C$_4$H$_9$ | blue |
| 28 | COCH$_3$ | H | CN | NHCOCH$_3$ | OCH$_3$ | C$_2$H$_5$ | C$_2$H$_5$ | greenish blue |
| 29 | COCH$_3$ | H | CN | NHCOCH$_3$ | OC$_2$H$_5$ | C$_2$H$_5$ | C$_2$H$_5$ | greenish |

TABLE 2-continued

Structure: thieno[2,3-b]thiophene with substituents X, Y (on one ring) and Z (on other ring) connected via N=N azo linkage to a phenyl ring bearing R⁵, R⁴, and N(R²)(R³).

| Exp. | X | Y | Z | $R^5$ | $R^4$ | $R^3$ | $R^2$ | Hue on PES |
|---|---|---|---|---|---|---|---|---|
| 30 | $COCH_3$ | H | CN | $NHCOCH_3$ | $OCH_3$ | $C_2H_4OCOCH_3$ | $C_2H_4OCOCH_3$ | blue |
| 31 | $COCH_3$ | H | CN | $NHCOCH_3$ | $OCH_3$ | $C_2H_4CN$ | $CH_2CH=CH_2$ | greenish blue |
| 32 | $COCH_3$ | H | CN | $NHCOCH_3$ | H | $C_2H_4OCH_3$ | $C_2H_5$ | greenish blue |
| 33 | $COCH_3$ | H | CN | $NHCOCH_3$ | H | $C_2H_4OCH_3$ | $C_2H_4OCH_3$ | blue |
| 34 | $COCH_3$ | H | CN | $NHCOCH_3$ | H | $C_4H_8OCOCH_3$ | $C_4H_8OCOCH_3$ | blue |
| 35 | $COCH_3$ | H | CN | $NHCOCH_3$ | H | $CH_2CH=CH_2$ | $CH_2CH=CH_2$ | blue |
| 36 | $COCH_3$ | H | CN | $NHCOCH_2CN$ | H | $C_2H_5$ | $C_2H_5$ | blue |
| 37 | $COCH_3$ | H | CN | $NHCOCH_2C_6H_5$ | H | $n-C_3H_7$ | $n-C_3H_7$ | blue |
| 38 | $COCH_3$ | H | CN | $CH_3$ | H | $C_2H_5$ | $C_2H_4OH$ | reddish blue |
| 39 | $COCH_3$ | H | CN | $CH_3$ | H | $C_2H_4OH$ | $C_2H_4OH$ | reddish blue |
| 40 | $COCH_3$ | H | CN | $NHCOCH_3$ | H | $C_2H_4OCOCH_3$ | $C_2H_4OCOCH_3$ | navy |
| 41 | $COCH_3$ | H | CN | $CH_3$ | $OCH_3$ | $C_2H_4OCOCH_3$ | $C_2H_4OCOCH_3$ | blue |
| 42 | $COCH_3$ | H | CN | H | H | $C_2H_5$ | $C_6H_5$ | bluish violet |
| 43 | $COCH_3$ | H | CN | $NHSO_2CH_3$ | H | $C_2H_5$ | $C_2H_5$ | blue |
| 44 | $COCH_3$ | H | CN | $NHCOC_2H_5$ | H | $C_2H_4OH$ | $C_2H_4OH$ | blue |
| 45 | $COCH_3$ | H | CN | H | $OCH_3$ | $C_2H_5$ | $C_2H_5$ | blue |
| 46 | $COCH_3$ | H | CN | $CH_3$ | H | $C_2H_5$ | $C_2H_4CN$ | bluish violet |
| 47 | $COCH_3$ | H | CN | $NHCOOC_2H_5$ | H | $C_2H_5$ | $C_2H_4OH$ | reddish blue |
| 48 | $COCH_3$ | H | CN | H | $OCH_3$ | $C_2H_4OCOCH_3$ | $C_2H_4OCOCH_3$ | blue |
| 49 | $COCH_3$ | H | CN | $NHCOCH(CH_3)_2$ | H | $C_2H_5$ | $C_2H_5$ | blue |
| 50 | $COCH_3$ | H | CN | $NHCOCH_3$ | H | $C_2H_4CN$ | $C_2H_5$ | reddish blue |
| 51 | $COCH_3$ | H | $CO_2C_2H_5$ | $NHCOCH_3$ | H | $C_2H_5$ | $C_2H_5$ | blue |
| 52 | $COCH_3$ | H | $CO_2C_2H_5$ | $NHCOC_2H_5$ | $CH_3$ | $n-C_3H_7$ | $n-C_3H_7$ | blue |
| 53 | $COCH_3$ | H | $CO_2C_2H_5$ | $NHCOCH_2OCH_3$ | H | $C_2H_4OCH_3$ | $C_2H_4OCH_3$ | blue |
| 54 | $COCH_3$ | H | $CO_2C_2H_5$ | $NHCOCH_3$ | $OCH_3$ | $C_2H_4OCOCH_3$ | $C_2H_4OCOCH_3$ | greenish blue |
| 55 | $COCH_3$ | H | $CO_2C_2H_5$ | $CH_3$ | H | $C_2H_4CN$ | $C_2H_5$ | bluish violet |
| 56 | $COCH_3$ | H | $CO_2C_2H_5$ | H | H | $C_2H_4CN$ | $C_2H_4OCOCH_3$ | violet |
| 57 | $COCH_3$ | H | $CO_2CH_3$ | $NHCOCH_3$ | H | $C_2H_5$ | $C_2H_5$ | blue |
| 58 | $CO_2C_2H_5$ | H | CN | $NHCOCH_3$ | H | $n-C_4H_9$ | $n-C_4H_9$ | reddish blue |
| 59 | $CO_2C_2H_5$ | H | CN | $NHCOCH_3$ | H | $C_2H_4OH$ | $C_2H_4OH$ | reddish blue |
| 60 | $CO_2C_2H_5$ | H | CN | $NHCOCH_2OC_6H_5$ | H | $C_2H_5$ | $C_2H_5$ | reddish blue |
| 61 | $CO_2C_2H_5$ | H | CN | $CH_3$ | H | $C_2H_5$ | $C_2H_5$ | violet |
| 62 | $CO_2C_2H_5$ | H | CN | H | H | $C_2H_5$ | $C_2H_5$ | violet |
| 63 | $CO_2C_2H_5$ | H | CN | $NHCOCH_3$ | H | $C_2H_5$ | $C_2H_5$ | reddish blue |
| 64 | $CO_2C_2H_5$ | H | CN | $NHCOCH_3$ | $OCH_3$ | $C_2H_4OCOCH_3$ | $C_2H_4OCOCH_3$ | blue |
| 65 | $CO_2CH_3$ | H | CN | $NHCOCH_3$ | H | $n-C_3H_7$ | $n-C_3H_7$ | reddish blue |
| 66 | $CO_2CH_3$ | H | CN | $CH_3$ | H | $C_2H_5$ | $C_2H_4CN$ | violet |
| 67 | $CO_2C_2H_5$ | H | CN | $CH_3$ | $OCH_3$ | $C_2H_4OCOCH_3$ | $C_2H_4OCOCH_3$ | blue |
| 68 | $CO_2C_2H_5$ | H | CN | $CH_3$ | H | $C_2H_5$ | $C_2H_4OH$ | reddish blue |
| 69 | $CO_2C_2H_5$ | H | $CO_2C_2H_5$ | $NHCOCH_3$ | H | $C_2H_5$ | $C_2H_5$ | reddish blue |
| 70 | $CO_2C_2H_5$ | H | $CO_2C_2H_5$ | $CH_3$ | H | $C_2H_4OH$ | $C_2H_4OH$ | reddish blue |
| 71 | $CO_2C_2H_5$ | H | $CO_2C_2H_5$ | $CH_3$ | H | $C_2H_5$ | $C_2H_4CN$ | violet |
| 72 | $CO_2H$ | H | CN | $NHCOCH_3$ | H | $C_4H_9$ | $C_4H_9$ | reddish blue |
| 73 | $CO_2H$ | H | CN | $NHCOC_2H_5$ | H | $C_2H_4OCOCH_3$ | $C_2H_4OCOCH_3$ | bluish violet |
| 74 | $CO_2H$ | H | CN | $NHCOCH_2OCH_3$ | H | $C_2H_5$ | $C_2H_5$ | blue |
| 75 | $CO_2H$ | H | CN | H | H | $C_2H_4CN$ | $C_2H_5$ | violet |
| 76 | CN | H | CN | $CH_3$ | H | $C_2H_4CN$ | $C_2H_5$ | violet |
| 77 | CN | H | CN | $NHCOCH_3$ | $OCH_3$ | $C_2H_5$ | $C_2H_5$ | greenish blue |

TABLE 2-continued

| Exp. | X | Y | Z | R⁵ | R⁴ | R³ | R² | Hue on PES |
|---|---|---|---|---|---|---|---|---|
| 78 | CN | H | CN | NHCOCH₃ | H | C₂H₅ | C₂H₅ | blue |
| 79 | CN | H | CN | NHCOC₂H₅ | H | C₂H₄OH | C₂H₄OH | blue |
| 80 | CN | H | CN | NHCOCH₃ | H | C₂H₄CN | C₂H₅ | reddish blue |
| 81 | NO₂ | H | CN | NHCOCH₃ | H | C₃H₇ | C₃H₇ | blue |
| 82 | NO₂ | H | CN | NHCOCH₃ | OC₂H₅ | C₂H₄CN | CH₂CH=CH₂ | greenish blue |
| 83 | NO₂ | H | CN | NHCOCH₃ | H | CH₂CH=CH₂ | CH₂CH=CH₂ | blue |
| 84 | NO₂ | H | CN | NHCOCH₂OCH₃ | H | C₂H₄OCOCH₃ | C₂H₄OCOCH₃ | blue |
| 85 | NO₂ | H | CN | NHCOCH₂Cl | H | C₄H₉ | C₄H₉ | blue |
| 86 | NO₂ | H | CN | CH₃ | H | C₂H₄OH | C₂H₅ | reddish blue |
| 87 | H | H | CN | NHCOCH₃ | H | C₄H₉ | C₄H₉ | violet |
| 88 | Cl | H | CN | CH₃ | H | C₂H₅ | C₂H₅ | violet |
| 89 | CN | Cl | CN | CH₃ | H | C₂H₄CN | C₂H₅ | violet |
| 90 | COCH₃ | H | CO₂C₂H₅ | NHCOCH₂Cl | H | C₂H₅ | C₂H₅ | blue |

The dyes of Table 3 conform to the formula

TABLE 3

| Exp. No. | K | Hue on PES |
|---|---|---|
| 91 | phenyl with H₃C, CH(CH₃)CH₂C(CH₃)₂ group, N(C₂H₅) | blue |
| 92 | phenyl with H₃C, CH(CH₃)CH₂C(CH₃)₂ group, N(C₂H₄OH), H₃C | blue |
| 93 | phenyl with H₃C, CH(CH₃)CH₂C(CH₃)₂ group, N(C₂H₅), NHCOCH₃ | blue |
| 94 | phenyl with OCH₂CH(CH₃)—, N(CH₂)₃CH₃, H₃C, H₃C | blue |
| 95 | naphthyl—NH—CH₂CHOHCH₂OH | blue |
| 96 | naphthyl—NH—CH₂CHOHCH₂OCH₂C≡CH | blue |
| 97 | naphthyl—NH—C₂H₄COOC₂H₅ | blue |

TABLE 3-continued

| Exp. No. | K | Hue on PES |
|---|---|---|
| 98 | H₅C₆ — thiophene — C(=N)N(CH₂CH₂CH₂CH₃)₂ (with CH₃ on ring, C=O–CH₃ top) | blue |
| 99 | H₅C₆ — thiophene — C(=N)NHC₆H₅ | blue |
| 100 | H₅C₆ — thiophene — C(=N)–morpholine | blue |
| 101 | H₅C₆ — thiophene with CN, N(C₂H₅)₂ | blue |
| 102 | H₃C — thiophene with CN, morpholine | blue |
| 103 | H₃C, CN, —NHC₃H₆OC₄H₈OH, NHC₂H₄OCH₃ (pyridine-type) | violet |
| 104 | H₃C, CN, —NHC₃H₄OC₄H₈OCOCH₃, NH₂ (pyridine-type) | reddish violet |
| 105 | H₃C, CN, —NH–C₆H₅, NHC₃H₄OCOCH₃ (pyridine-type) | bluish violet |

EXAMPLE 106

0.57 part of p-dithiane-2,5-diol and 0.7 part of potassium carbonate were added to 2.08 parts of 4-chloro-3-cyano-5-formyl-2-(4'-N,N-dibutylamino-2'-methylphenylazo)thiophene in 50 parts by volume of N,N-dimethylformamide. The reaction mixture was stirred at 50° C. under N₂ for 4 hours and then poured onto 500 parts of water. The dye was salted out with NaCl, filtered with suction and washed with water. This gave 1.8 parts of the dye of the formula

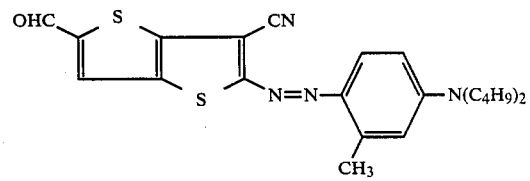

which dyes polyester fibers in blue, fast shades.

EXAMPLE 107

1.35 parts of 30% strength methanolic sodium methylate solution and 0.9 part of ethyl mercaptoacetate were added to 2.3 parts of 4-chloro-3-cyano-5-formyl-2-(4'-N,N-dibutylamino-2'-acetylaminophenylazo)thiophene in 60 parts by volume of methanol and 50 parts by volume of N,N-dimethylformamide. The mixture was stirred at 25° C. for 10 hours and then at 50° C. for 2 hours and was then discharged onto 500 parts of water. The product was salted out with NaCl, filtered off with suction and washed with water. This gave 2.5 parts of the dye described in Example 58.

EXAMPLE 108

1.75 parts of the dye described in Example 106 were stirred at 25° C. with 0.9 part of ethyl cyanoacetate in 70 parts by volume of dioxane, 0.5 part by volume of glacial acetic acid and 0.5 part by volume of piperidine for 24 hours. 25 parts of water and 25 parts of ice were then added. After 15 minutes of stirring, the product was filtered off with suction and washed until neutral. Drying under reduced pressure at 40° C. left 1.7 parts of the dye of the formula

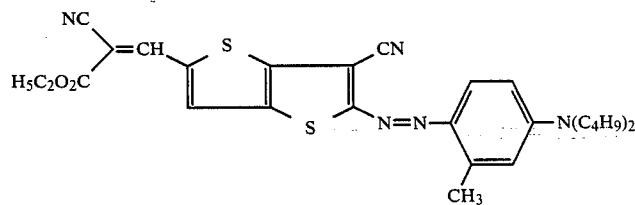

which dyes polyester fibers in greenish blue shades.
Table 4 lists dyes of the formula

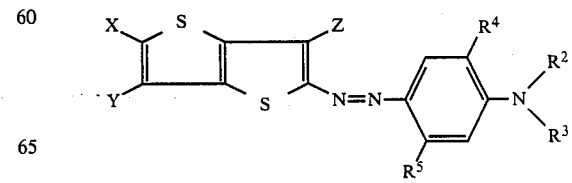

which can be obtained in a similar manner.

TABLE 4

| Exp. | X | Y | Z | $R^5$ | $R^4$ | $R^3$ | $R^2$ | Hue on PES |
|---|---|---|---|---|---|---|---|---|
| 109 | CHO | H | CN | $NHCOCH_3$ | H | $C_2H_5$ | $C_2H_5$ | blue |
| 110 | CHO | H | CN | $NHCOC_2H_5$ | H | $C_2H_5$ | $C_2H_5$ | blue |
| 111 | CHO | H | CN | $CH_3$ | H | $C_2H_5$ | $C_2H_5$ | reddish blue |
| 112 | CHO | H | $CO_2C_2H_5$ | $NHCOC_2H_5$ | H | $n-C_4H_9$ | $n-C_4H_9$ | blue |
| 113 | CHO | H | CN | $CH_3$ | H | $C_2H_4CN$ | $C_2H_5$ | blue |
| 114 | CHO | H | CN | $NHCOCH_3$ | $OCH_3$ | $C_2H_5$ | $C_2H_5$ | greenish blue |
| 115 | X* | H | CN | $CH_3$ | H | $C_2H_4CN$ | $C_2H_5$ | blue |
| 116 | X** | H | CN | H | H | $C_2H_5$ | $C_2H_5$ | blue |
| 117 | X* | H | CN | $CH_3$ | H | $n-C_4H_9$ | $n-C_4H_9$ | greenish blue |

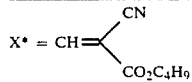

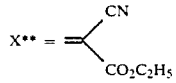

We claim:

1. A thienothiophene dye of the formula I

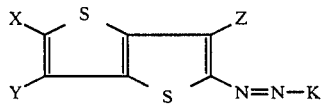

where

Z is $C_1-C_8$-alkoxycarbonyl or $C_1-C_8$alkoxycarbonyl whose alkyl chain is interrupted by one or more oxygen atoms, or is $C_{1-4}$ alkyl, $C_{1-4}$ alkoxy or halogen substituted phenoxycarbonyl or unsubstituted phenoxycarbonyl, carbamoyl, $C_1-C_8$-mono-alkyl-carbamoyl or -dialkyl-carbamoyl, pyrrolidinocarbonyl, piperidinocarbonyl, morpholinocarbonyl, piperazinocarbonyl, (N-$C_1-C_4$-alkyl)-piperazinocarbonyl, carboxyl, cyano, $C_1-C_{10}$-alkanoyl, $C_{1-4}$ alkyl, $C_{1-4}$ alkoxy or halogen substituted phenylcarbonyl or unsubstituted phenylcarbonyl, $C_1-C_4$-alkylsulfonyl, $C_{1-4}$ alkyl, $C_{1-4}$ alkoxy or halogen substituted phenylsulfonyl or unsubstituted phenylsulfonyl or nitro, X is hydrogen, fluorine, chlorine, bromine, Z or a group of the formula —CH=$CT^1T^2$, —CH=N—OH, —CH=N—NH—$C_6H_5$ or

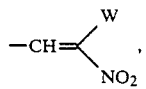

where $T^1$ and $T^2$ are identical or different and each is, independently of the other, cyano, $C_1-C_8$-alkoxy carbonyl or $C_1-C_8$-alkoxycarbonyl whose alkyl chain is interrupted by one or more oxygen atoms, or is $C_3-C_6$-alkenyloxycarbonyl, carbamoyl or $C_1-C_4$-monoalkylaminocarbonyl or -dialkylaminocarbonyl and W is hyrogen, methyl or ethyl, Y is hydrogen, chlorine or bromine and K is the radical of a coupling component.

2. A thienothiophene dye as claimed in claim 1 where K is derived from a coupling component of the formula

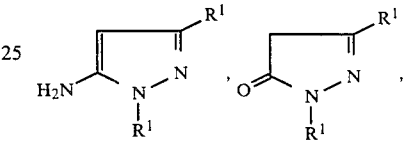

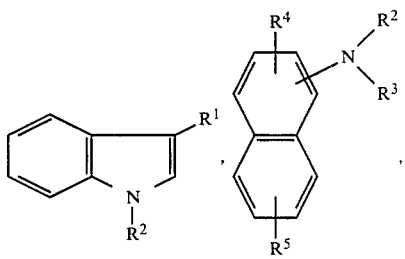

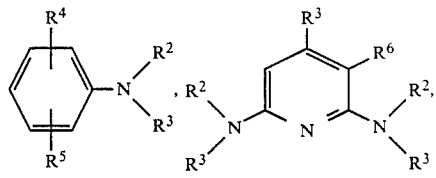

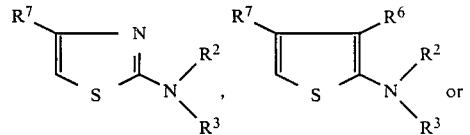

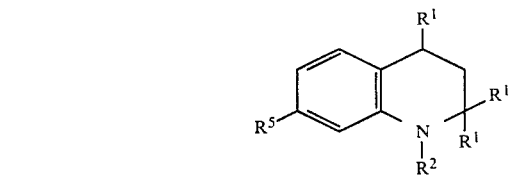

where $R^1$ is hydrogen, $C_1-C_4$-alkyl, $C_1-C_4$ alkyl substituted by phenyl, or $C_{1-4}$ alkyl, $C_{1-4}$ alkoxy or halogen substituted phenyl or unsubstituted phenyl, $R^2$ is hydrogen or $R^3$, $R^3$ is $C_1-C_6$-alkyl, or $C_1-C_6$-alkyl substituted by chlorine, bromine, hydroxyl, $C_1-C_8$-alkoxy, propargyloxy, phenoxy, phenyl, cyano, carboxyl, $C_1$–$C_8$-alkanoyloxy, $C_1$–$C_8$-alkoxy-$C_1$–$C_4$-alkoxy, benzoyloxy, o-, m- or p-methylbenzoyloxy, o-, m- or p-chlorobenzoyloxy, $C_1$–$C_8$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenethyloxycarbonyl; $C_5$–$C_7$-cycloalkyl, $C_3$–$C_4$-alkenyl or $C_{1-4}$ alkyl, $C_{1-4}$ alkoxy or halogen substituted phenyl or unsubstituted phenyl, $R^4$ and $R^5$ are each independently of the other hydrogen, $C_1$–$C_4$-alkyl, $C_1$–$C_4$-alkoxy, phenoxy, benzyloxy, halogen, $C_1$–$C_4$-alkylsulfonylamino, $C_1$–$C_4$-dialkylaminosulfonylamino, $C_1$–$C_6$-alkanoylamino, or $C_1$–$C_6$-alkanoylamino substituted by chlorine, bromine, cyano, methoxy, ethoxy, phenoxy, hydrogen, methyl, ethyl, propyl, methylsulfonylamino, dimethylaminosulfonylamino, methoxycarbonylamino or ethoxycarbonylamino; benzoylamino or $C_1$–$C_4$-alkoxycarbonylamino, $R^6$ is cyano, carbamoyl, $C_1$–$C_4$-monoalkylcarbamoyl or -dialkylcarbamoyl, nitro or $C_1$–$C_8$-alkoxycarbonyl or $C_1$–$C_8$-alkoxycarbonyl whose alkyl chain is interrupted by one or more oxygen atoms, and $R^7$ is halogen, nitro, $C_{1-4}$ alkyl, $C_{1-4}$ alkoxy, or halogen substituted phenyl or unsubstituted phenyl, $C_1$–$C_{10}$-alkyl or $C_1$–$C_{10}$-alkoxy or $C_1$–$C_{10}$-alkyl or $C_1$–$C_{10}$-alkoxy wherein the alkyl chain is interrupted by one or more oxygen atoms or substituted by phenyl, or is phenoxy, $C_1$–$C_4$-monoalkylamino or -dialkylamino, $C_1$–$C_4$-alkylthio, phenylthio, $C_1$–$C_4$-alkoxycarbonyl, $C_1$–$C_5$-alkanoylamino, $C_1$–$C_4$-alkoxycarbonylmethyl or cyanomethyl.

3. A thienothiophene dye as claimed in claim 1, wherein X is formyl, acetyl, $C_1$–$C_4$-alkoxycarbonyl, nitro or cyano, Y is hydrogen, Z is cyano, $C_1$–$C_2$-alkoxycarbonyl, $C_1$–$C_2$-monoalkylcarbamoyl, $C_1$–$C_2$-alkylsulfonyl or phenylsulfonyl, and K is an aniline, thiazole or pyridine radical.

4. The method of using a compound as claimed in claim 1 for dyeing synthetic fibers.

5. The thienothiophene dye as claimed in claim 2, wherein $R^3$ is $C_{1-6}$ alkyl, said $C_{1-6}$ alkyl being monosubstituted or polysubstituted by chlorine, bromine, hydroxyl, $C_1$–$C_8$-alkoxy, propargyloxy, phenoxy, phenyl, cyano, carboxyl, $C_1$–$C_8$-alkanoyloxy, $C_1$–$C_8$-alkoxy-$C_1$–$C_4$-alkoxy, benzoyloxy, o-, m- or p-methylbenzoyloxy, o-, m- or p-chlorobenzoyloxy, $C_1$–$C_8$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenethyloxycarbonyl.

6. The thienothiophene dye as claimed in claim 2, wherein $R^4$ and $R^5$ are, independently, $C_{1-6}$-alkanoylamino, wherein said $C_{1-6}$-alkanoylamino is substituted by chlorine, bromine, cyano, methoxy, ethoxy, phenoxy hydrogen, methyl, ethyl, propyl, methylsulfonylamino, dimethylaminosulfonylamino, methoxycarbonylamino or ethoxycarbonylamino.

* * * * *